(12) United States Patent
Mohamed

(10) Patent No.: US 7,378,982 B2
(45) Date of Patent: May 27, 2008

(54) ELECTRONIC DISPLAY WITH MULTIPLE PRE-PROGRAMMED MESSAGES

(76) Inventor: Abdulahi Mohamed, 4149 Cambridge Street, Burnaby, BC (CA) V5C 1G8

( * ) Notice: Subject to any disclaimer, the term of this patent is extended or adjusted under 35 U.S.C. 154(b) by 1160 days.

(21) Appl. No.: 09/964,590

(22) Filed: Sep. 28, 2001

(65) Prior Publication Data
US 2006/0049954 A1    Mar. 9, 2006

Related U.S. Application Data

(60) Provisional application No. 60/235,914, filed on Sep. 28, 2000.

(51) Int. Cl.
*G08B 7/00* (2006.01)

(52) U.S. Cl. .................. 340/691.6; 340/468

(58) Field of Classification Search ............ 340/468, 340/472, 330, 332, 286.08, 32
See application file for complete search history.

(56) References Cited

U.S. PATENT DOCUMENTS

| | | | | |
|---|---|---|---|---|
| 4,852,284 | A * | 8/1989 | Faggiano | 40/488 |
| 5,953,842 | A * | 9/1999 | Bodell | 40/570 |
| 5,998,925 | A * | 12/1999 | Shimizu et al. | 313/503 |
| 6,236,303 | B1 * | 5/2001 | Wagner et al. | 340/286.08 |
| 6,768,424 | B1 * | 7/2004 | Morris | 340/628 |
| 2006/0069749 | A1 * | 3/2006 | Herz et al. | 709/219 |

* cited by examiner

*Primary Examiner*—Benjamin C. Lee
*Assistant Examiner*—Shirley Lu

(57) ABSTRACT

Currently pre-printed signs are used for many functions and are not always appropriate or attractive. The present invention provides an electronic display with multiple pre-programmed messages. A particularly useful application is for preprogrammed messages to be displayed by a hotel guest on the corridor side of the hotel room door.

13 Claims, 9 Drawing Sheets

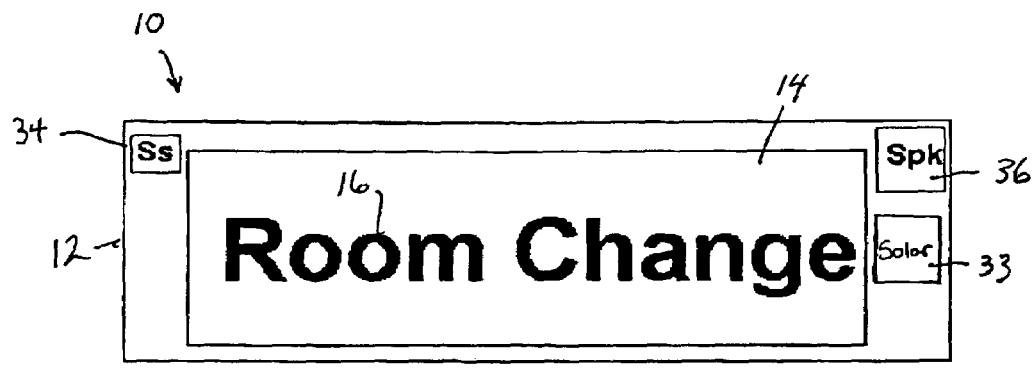
FIG. 1
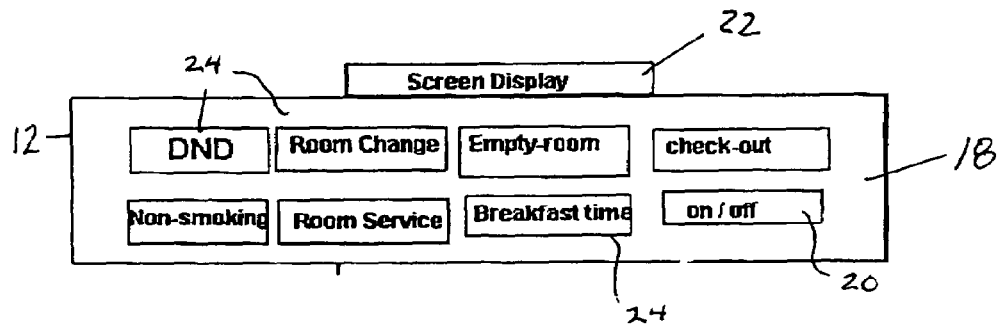
FIG. 2
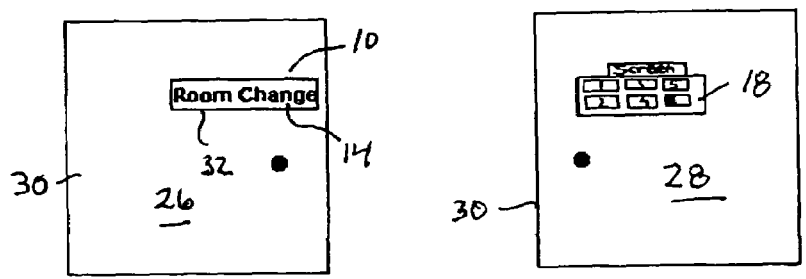
FIG. 3
FIG. 4
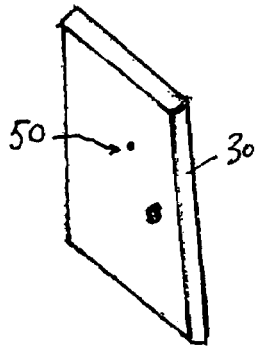
FIG. 5

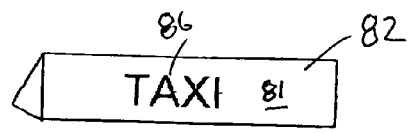
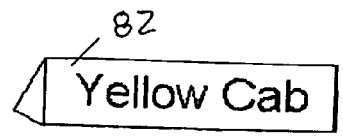
FIG. 8            FIG. 9
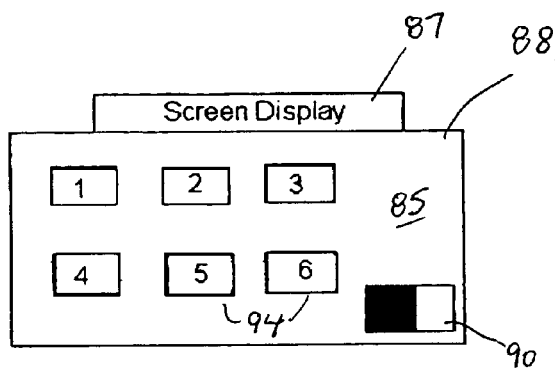
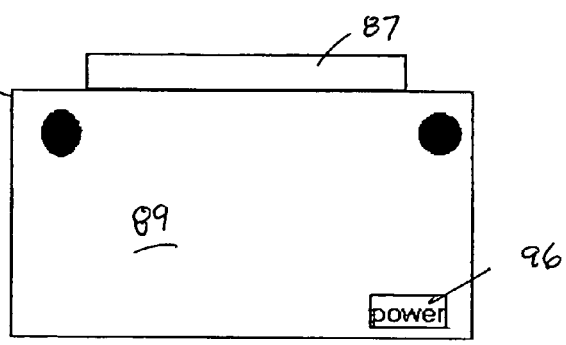
FIG. 10          FIG. 11
Messages
- [1] Taxi - Yellow Cab
- [2] In Service
- [3] Out Service
- [4] Other Messages
- [5] Handicap Access
- [6] Help / Emergency
- ▮▯ On / Off
FIG. 12

ELECTRONIC DISPLAY WITH MULTIPLE PRE-PROGRAMMED MESSAGES

CROSS-REFERENCE TO RELATED APPLICATION

This application claims the benefit of priority from U.S. provisional application No. 60/235,914 filed Sep. 28, 2000.

TECHNICAL FIELD

The invention relates to the field of display signs, and more particularly to an electronic display sign on which various pre-programmed messages can be displayed.

BACKGROUND ART

Currently vinyl or plastic display signs with pre-printed messages are in wide use for various everyday applications, such as where a merchant or service provider wishes to convey information to a customer. For example, stores use "Closed—Back At . . . " or "Open" signs, or pre-printed signs displaying store hours. Hotel rooms are provided with "Do Not Disturb" or "Maid Service" signs and an office conference room may have a sign "Meeting in Session". Such display signs are often unprofessional looking, or a party may require a customized message which is not available on a pre-printed sign.

Previous electronic display signs with changeable messages are known for various applications. For example, U.S. Pat. No. 6,060,993 Cohen, issued May 9, 2000, discloses a mobile display on a vehicle which has a changeable electronic message using LED or liquid crystal display. U.S. Pat. No. 5,132,666 Fahs, issued Jul. 21, 1992, discloses a display on a vehicle which has both a changeable electronic message panel using LED display, and a fixed illuminated display. There is a need however for an electronic display sign with changeable messages for universal application on which the message can be easily changed.

DISCLOSURE OF INVENTION

The present invention therefore provides an electronic display with multiple pre-programmed messages. The invention provides a sign for displaying multiple pre-programmed messages, comprising: a) a hollow housing; b) a display screen mounted in said housing; c) a power source in said housing for supplying electric power to said display screen; d) central processing device for providing display information to said screen; and e) means on said housing for selecting a message to be displayed. More particularly the invention provides a device for displaying multiple pre-programmed messages, comprising: a) a first housing adapted to be mounted in a first location; b) a first electronic display screen mounted in the first housing; c) a second housing adapted to be mounted in a second location; d) a second electronic display screen mounted in the second housing; e) a first processing device for providing display information to the display screen in said first housing; f) a second processing device for providing display information to the display screen in said second housing; e) a power source in one of the first or second housings for supplying electric power to the display screens and the first and second processing devices; f) means for selecting a message to be displayed on the first and second displays; and g) means for conducting electric signals between the first and second processing devices

BRIEF DESCRIPTION OF DRAWINGS

In drawings which illustrate a preferred embodiment of the invention:

FIG. 1 is a front view of a first embodiment of the invention as applied to a hotel room door;

FIG. 2 is a rear view of the invention as shown in FIG. 1;

FIG. 3 is a front view of the invention installed in a hotel room door;

FIG. 4 is a rear view of the invention installed in a hotel room door;

FIG. 5 is a perspective view of a hotel room door illustrating the connecting hole for the invention shown in FIG. 1;

FIG. 8 is a front perspective view of the invention as applied to a taxi rooftop sign;

FIG. 9 is a rear perspective view of the invention as shown in FIG. 8;

FIG. 10 is a front view of the control panel of the invention as applied to a taxi rooftop sign;

FIG. 11 is a rear view of the control panel of the invention as shown in FIG. 11;

FIG. 12 is a table showing the legend of messages for FIG. 10;

BEST MODE(S) FOR CARRYING OUT THE INVENTION

Figure 6:
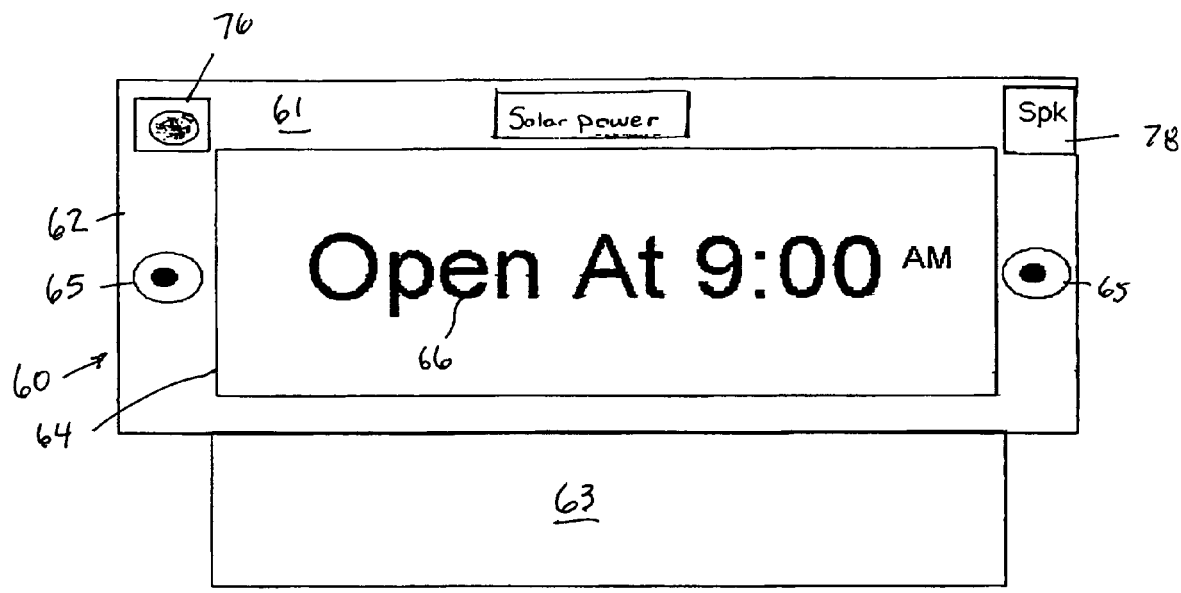
FIG. 6 is a front view of the invention as applied to a retail store sign.

With reference to FIGS. 1 and 2, a first embodiment of the electronic display sign of the invention is generally designated by reference numeral 10. It consists of a hollow, rectangular plastic housing 12 having a front electronic display panel 14 which may be an LED or liquid crystal display to display a message 16. The display may be back-lit, and may provide color and graphics, and may include a flashing or moving message display. More than one line of text may be provided. Rear face 18 has on-off switch 20 and a plurality of message buttons 24, each labelled with the corresponding pre-programmed message which button 24 causes to be displayed on display panel 14, or a corresponding number, code, or abbreviation, and a rear display screen 22 to display the selected message to the occupant. Display 22 may be separate or attached to rear face 18. In the case of a hotel door sign, the messages may be DO NOT DISTURB, ROOM CHANGE, EMPTY ROOM, CHECKOUT, NON-SMOKING, TEMPERATURE, BREAKFAST PLEASE, LEAVE EXTRA TOWELS, STOCK MINIBAR, etc., or it may display a universally-understood graphical symbol such as the "NO SMOKING" symbol, etc. In the case of a washroom door, the messages OCCUPIED; MEN'S—VACANT; OUT OF SERVICE etc. may be used. The occupant may also enter a custom message by entering letters individually on a keypad (not shown) or via a remote control keypad as used for a television or VCR. FIG. 3 shows the hotel room door 30, having outer surface 26 facing the hotel corridor, with the display sign 10 installed through an opening 32 in door 30 so that panel 14 is visible on the exterior surface 26 of door 30. Similarly rear panel 18 is accessible to an occupant of the room on the interior surface 28 of door 30. To display a message, the occupant activates the device by pressing on-button 20, and selects a pre-programmed message by pressing one of the buttons 24.

Display sign 10 is also provided with motion sensor 34 and speaker 36. The motion sensor 34 preserves power by maintaining the main sign display power off until the sensor detects movement. When sensor 34 senses movement, it signals central processor 42 which in turn activates the power to the display. It may also generate an audio signal corresponding to the displayed message 16. In this way the device is useful for persons who may be sight-impaired, illiterate, or cannot read English. Housing 12 may be formed of an opaque, hard molded plastic, metal or other similar material and has mounted in its interior a 9 volt battery 44, or other small battery, to provide power to CPU 42, or alternatively 120V AC power may be provided from a standard outlet, or the device may be powered by a solar cell 33. Message 16 can also be entered remotely, such as from a hotel front desk, by using a wireless or wired connection to a remote selection panel.

While the preferred embodiment of the invention comprises a single housing, to avoid the need for a large cutout in door 30, it can be achieved using two separate housings, one for the display panel 14 as shown in FIG. 1 and a second housing for the selection display 18 as shown in FIG. 2, joined by an electrical connection extending through a hole 50 in door 30 (FIG. 5).

Figure 14:
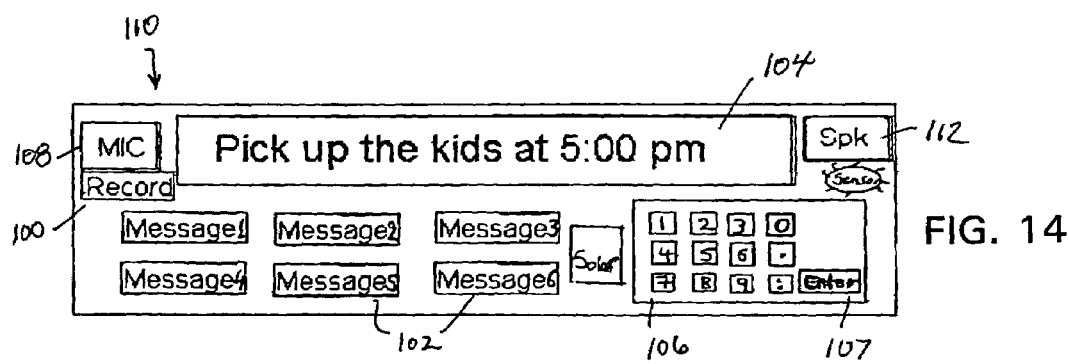
FIG. 14 is a front view of the invention as applied to a household sign.
Figure 15:
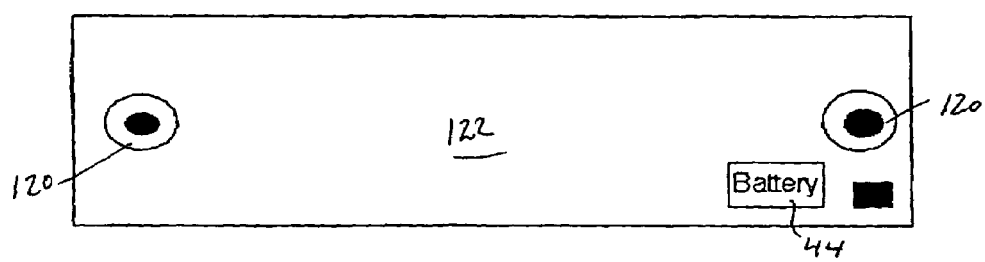
FIG. 15 is a rear view of the invention as shown in FIG. 14.

The foregoing invention can also be used to permit persons to leave a message for the occupant, as shown in the embodiment 110 in FIG. 14, either text or voice. A visitor can press the "record" button 100 and leave an audio message through microphone 108, or select a pre-programmed message 102 which is displayed on the external screen 104 and the visitor is then prompted to press the "enter" button 107 to leave the message for the occupant. A flashing red LED is then initiated to indicate to the occupant that a message is waiting. To check messages, the occupant enters a code on keypad 106 and either an audio or textual message can be listened to over speaker 112 or read on screen 104. Sign 110 can be attached to a surface, for example, by suction cups 120 on rear surface 122.

Figure 7:
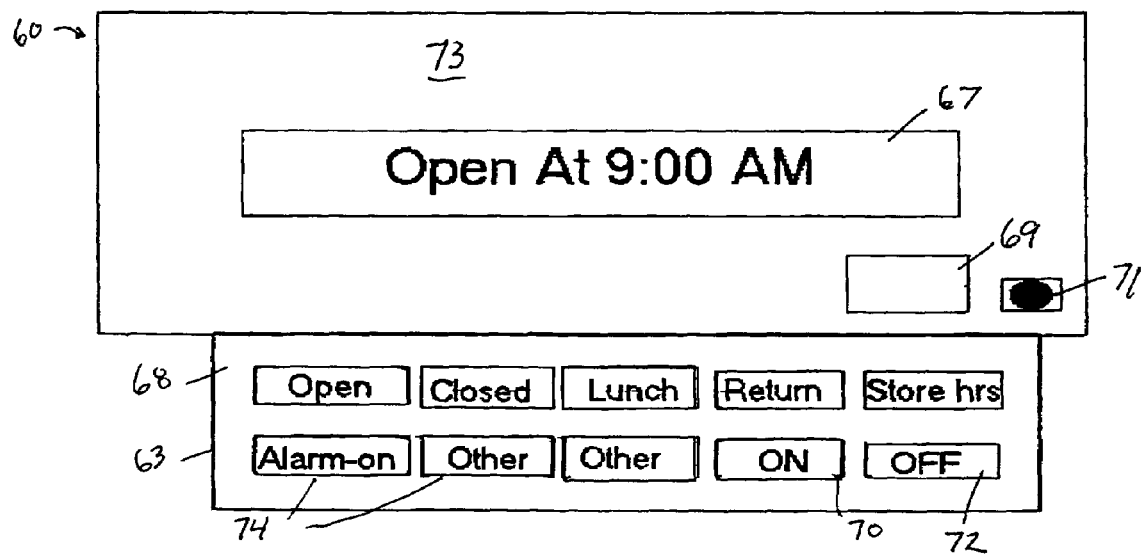
FIG. 7 is a rear view of the invention as shown in FIG. 6.
Figure 13:
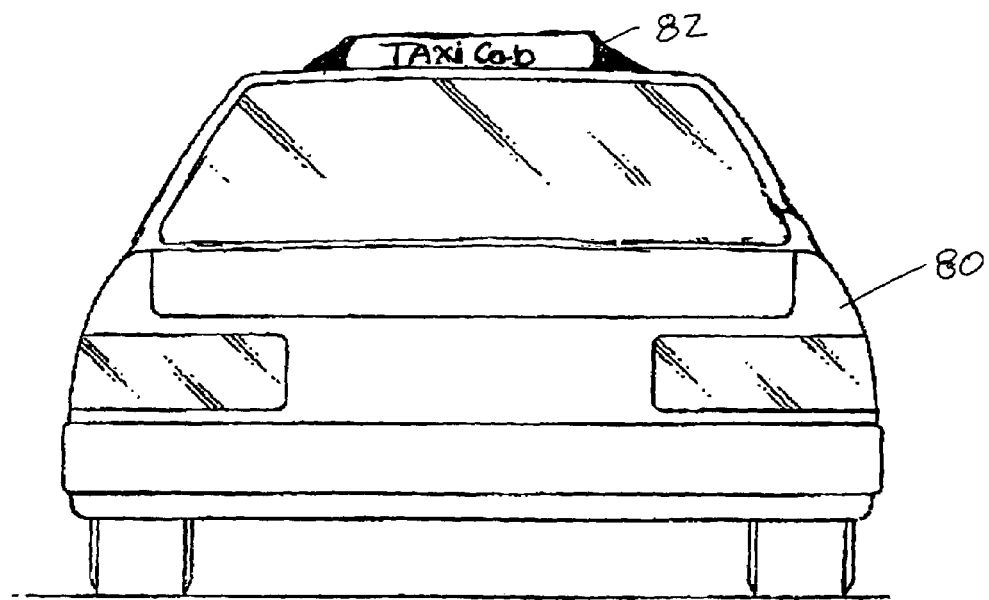
FIG. 13 is a front perspective view of the invention as applied to a taxi rooftop sign.

Referring to the embodiment shown in FIGS. 6 and 7 of the drawings, an electronic display sign of the invention for use in a retail store window is generally designated by reference numeral 60. It consists of a hollow, rectangular plastic housing 62 having a front surface 61 and an electronic display panel 64 which may be an LED or liquid crystal display to display a message 66. Attached to front face 61 of housing 62 are suction cups 65 for removably attaching the unit to a storefront window. Connected to housing 62 is a rectangular selection button housing 63. Rear face 73 of housing 62 has a display screen 67, battery access panel 69 for accessing battery power, whether a 9 volt or miniature lithium-type battery, and a plug-in 71 for connecting a power adapter for providing power from an electrical outlet through an adapter. Rear face 68 of housing 63 has on-off switches 70, 72 and a plurality of message buttons 74, each labelled with the corresponding pre-programmed message which button 74 causes to be displayed on display panels 64, 67 or a corresponding number, code, or abbreviation. In the case of a retail store door sign, the messages may be OPEN; CLOSED; LUNCH; RETURN AT - - - ; STORE HOURS - - - ; ALARM ON; etc. The store owner may also enter a custom message by entering letters individually on a keypad (not shown) or via a remote control keypad as used for a television or VCR. For example the sign may be used to display the price of an item. To display a message, the store owner activates the device by pressing on-button 70, and selects a pre-programmed message by pressing one of the buttons 74. Display sign 60 is also provided with motion sensor 76 and speaker 78 as in the first embodiment.

Referring to the embodiment shown in FIG. 8 through 13 of the drawings, an electronic display sign of the invention for use on a taxi 80. It consists of a hollow, triangular plastic display housing 82 having a front display panel 81 and a rear electronic display panel 83, which may be an LED or liquid crystal display to display a message 86. Housing 82 is removably attached to the roof of taxi 80, and electrically connected to the control housing 88 located adjacent the taxi driver. Front face 85 of control housing 83 has a display screen 87, on-off switch 90, and a plurality of message buttons 94, each labelled with a number, code, or abbreviation corresponding to the pre-programmed message which button 94 causes to be displayed on display panels 81, 83. Rear face 89 has a plug-in 96 for connecting a DC power connection from the taxi electrical system. In the case of a taxi sign, the preferred messages may be TAXI; IN SERVICE; OUT OF SERVICE; HANDICAP ACCESS; HELP! EMERGENCY! etc. When the "Emergency" message is entered, a different lighting, such as more intense, or flashing, may also be initiated. The driver may also enter a custom message by entering letters individually on a keypad (not shown). To display a message, the taxi driver activates the device by pressing on-button 90, and selects a pre-programmed message by pressing one of the buttons 94. The second message is selected, for example, by consecutively pressing two buttons, or the same button twice, or there may be provided a specific button for selecting the option of entering a different message for the second message. In this embodiment, the message system can be connected to the central computer dispatch or taxi meter system so that message display automatically displays when the taxi is vacant (available) or occupied (unavailable). The invention can also be used for other types of vehicles which require a display, such as pizza delivery vehicles, parking enforcement officers, road construction vehicles which require a directional signal, driving instructors ("NEW DRIVER" message), realtor's vehicle ("OPEN HOUSE") or generally for advertising purposes.

Figure 16:
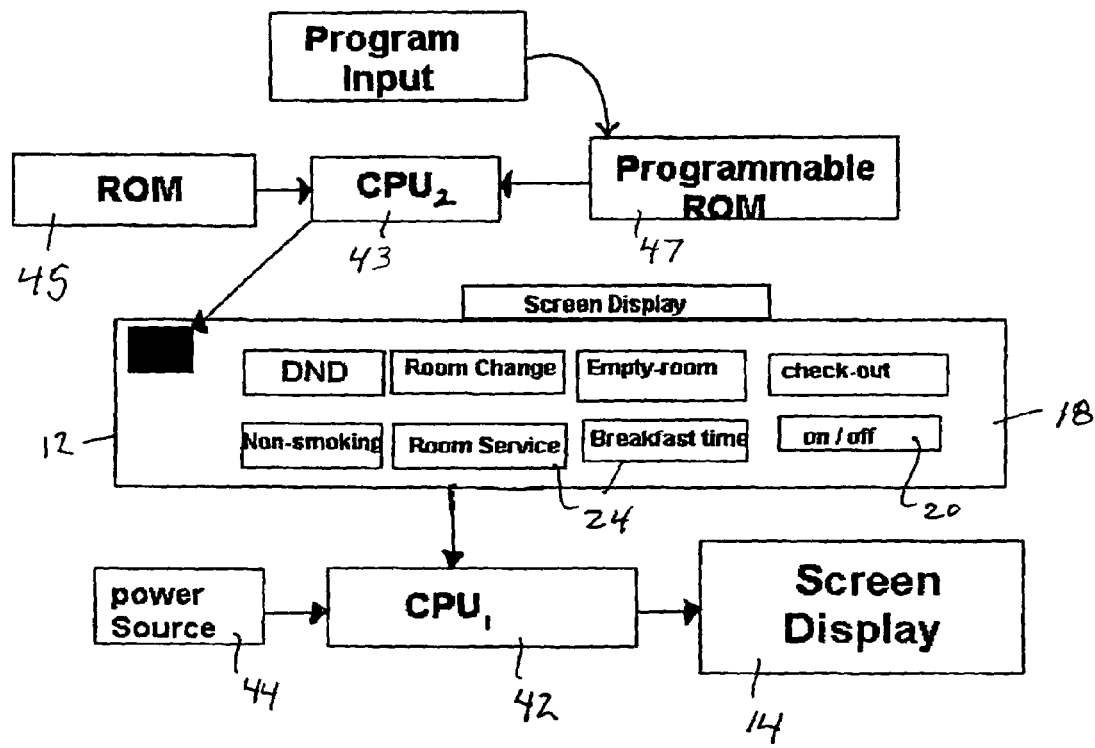
FIG. 16 is a schematic diagram illustrating the circuitry of the invention.
Figure 17:
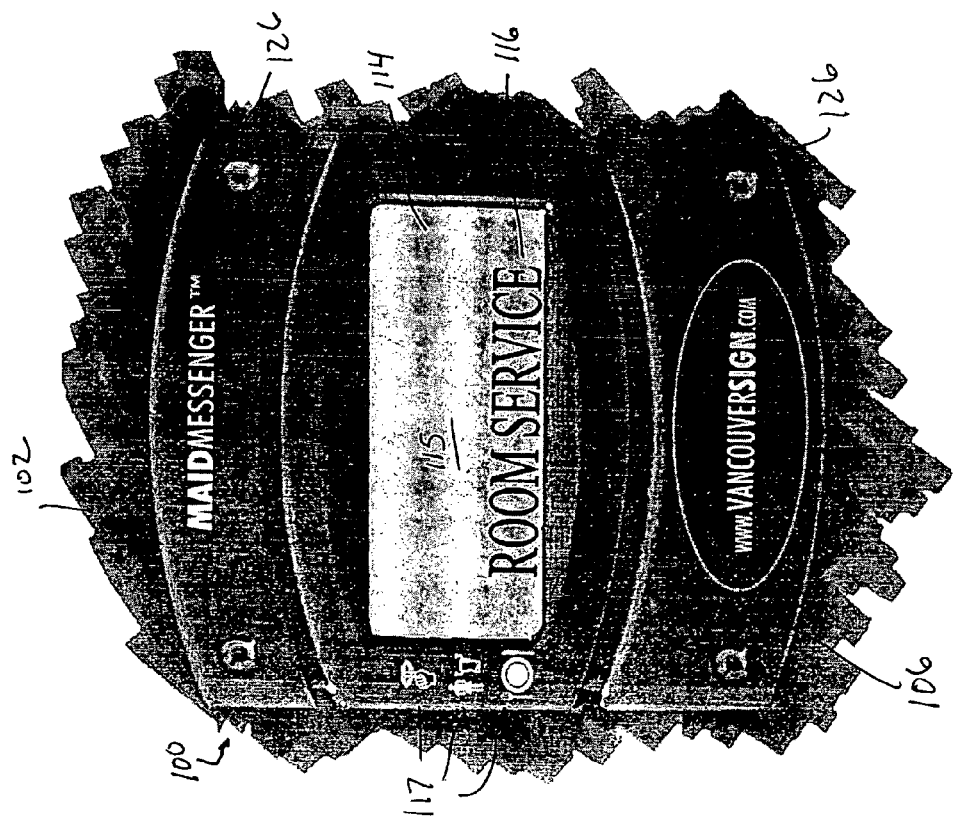
FIG. 17 is a front view of a further embodiment of the invention as applied to a hotel room door.
Figure 18:
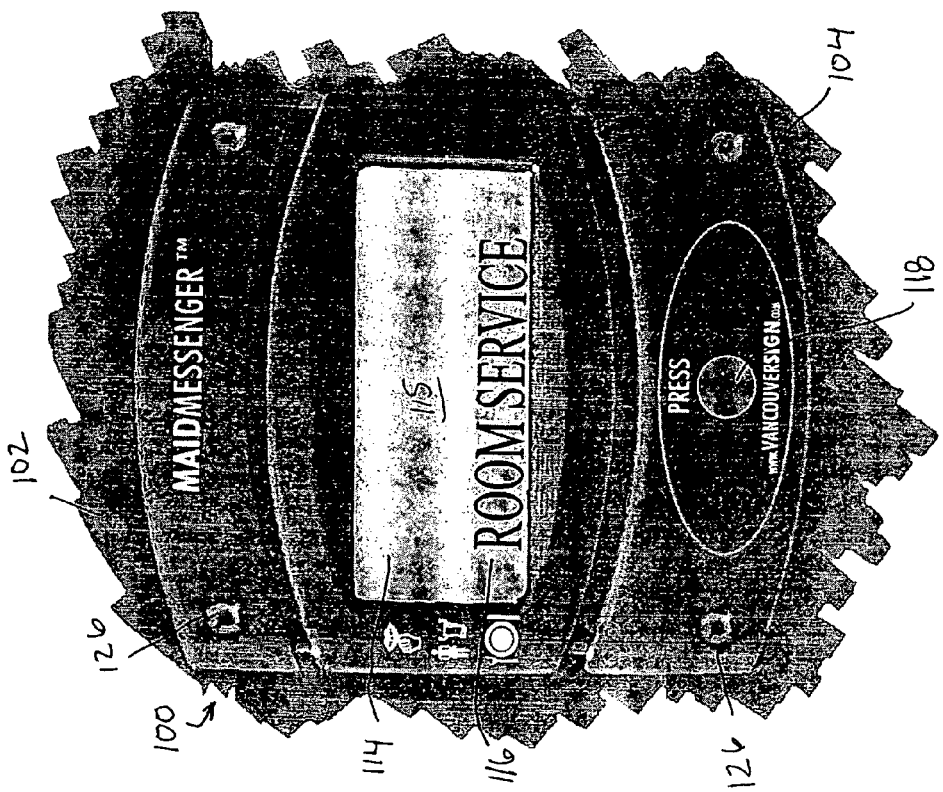
FIG. 18 is a rear view of the invention as shown in FIG. 17.

FIG. 16 illustrates schematically how $CPU_1$ 42 controls the screen display. $CPU_1$ 42, mounted within housing 12, communicates the display instructions to the display screen according to the pre-programmed message selected on selection buttons 24, and is provided with power by power source 44. A message may be programmed into $CPU_1$ for a particular button by inputting the appropriate program code from an external $CPU_2$ 43 which in turn is provided with the program code on a pre-programmed ROM chip 45, or which has been programmed onto a programmable ROM 47 by a program input.

Figure 19:
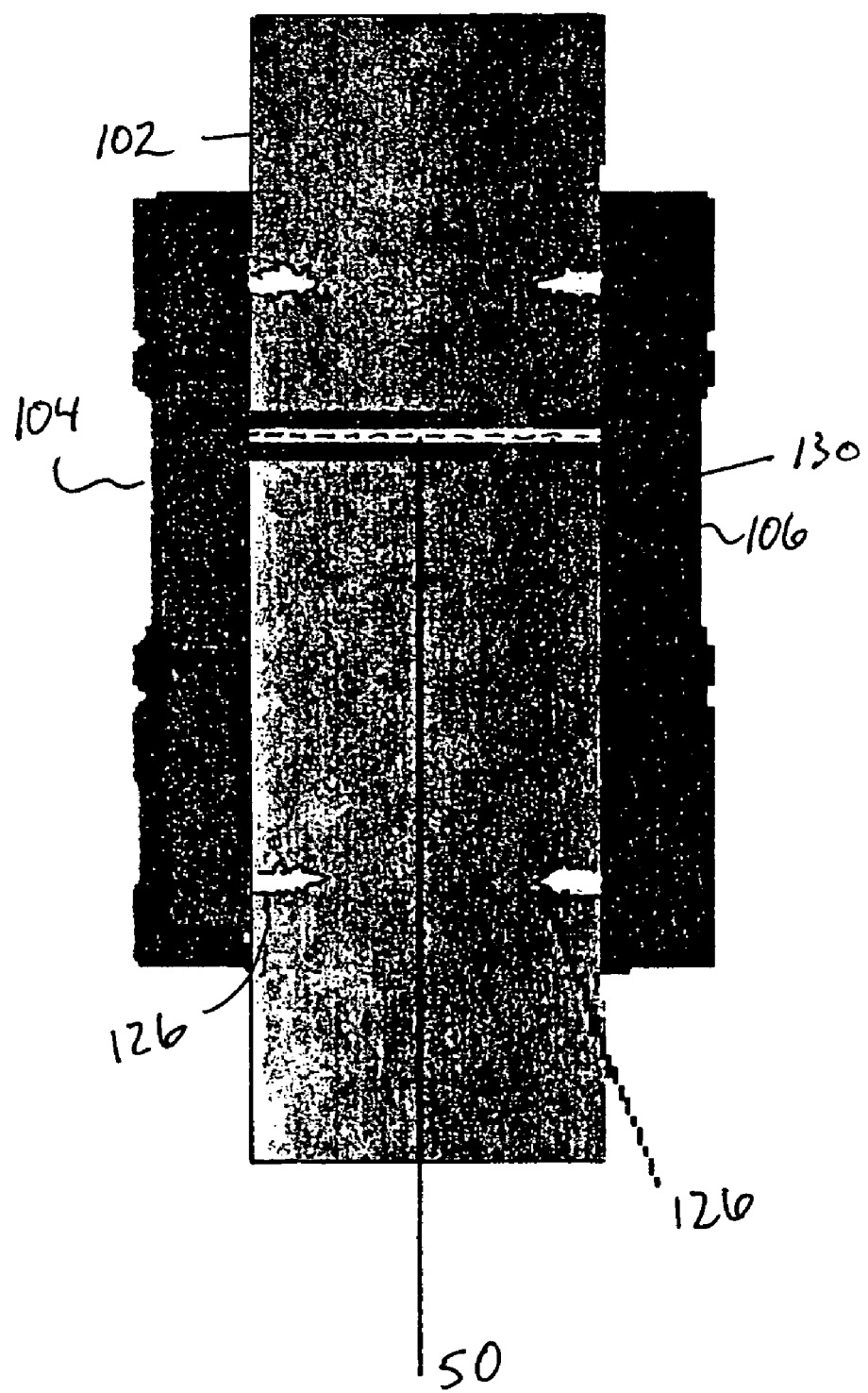
FIG. 19 is a cross-sectional view of the invention shown in FIG. 17 installed in a hotel room door taken along lines A-A of FIG. 17.
Figure 20:
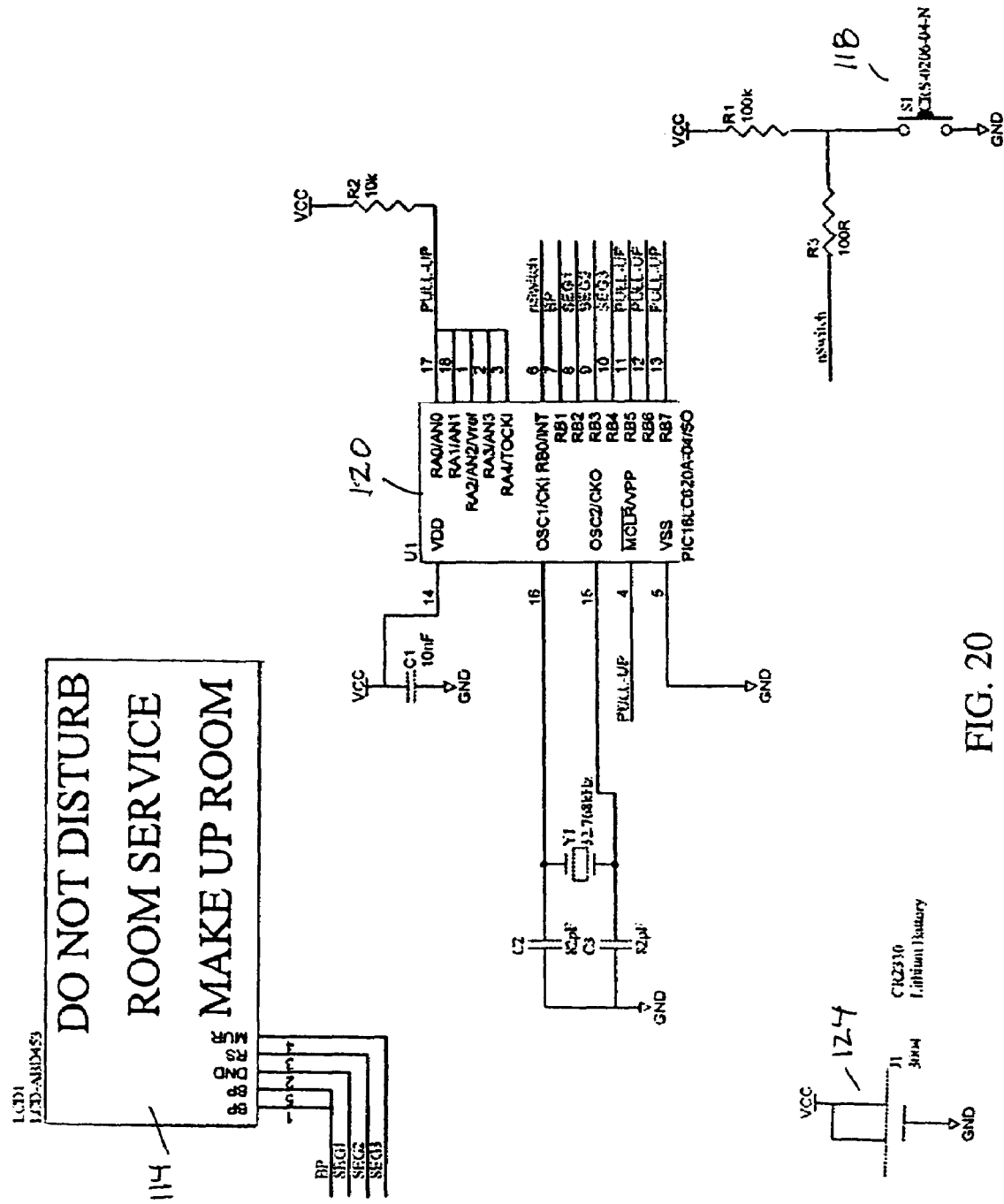
FIG. 20 is a circuit diagram for the embodiment of the invention shown in FIG. 17.

With reference to FIG. 17 through 21, a further embodiment of the electronic display sign of the invention as applied to a hotel room door 102 is generally designated by reference numeral 100. As shown in FIG. 19, the device comprises a housing 104 (FIG. 17) mounted on the interior of door 102 and a housing 106 (FIG. 18) mounted on the exterior or corridor side of door 102. Housings 104, 106 consist of hollow plastic housings each having a front electronic display panel 114 which comprises a custom liquid crystal display (LCD) to display a message 116. LED lights can be used to back-light the display screen 114. Display panel 114 is covered with a transparent polycarbonate lens 115. In the example shown, one of three pre-programmed messages DO NOT DISTURB, MAKE UP ROOM, ROOM SERVICE, or no message, is selected by depressing button 118 which scrolls up or down, illuminating one of the three message lines. The messages are also indicated by symbols 117 which permits the device to function for many languages. The same message is also displayed on the corridor facing unit 106 as on the interior unit 104.

Figure 21:
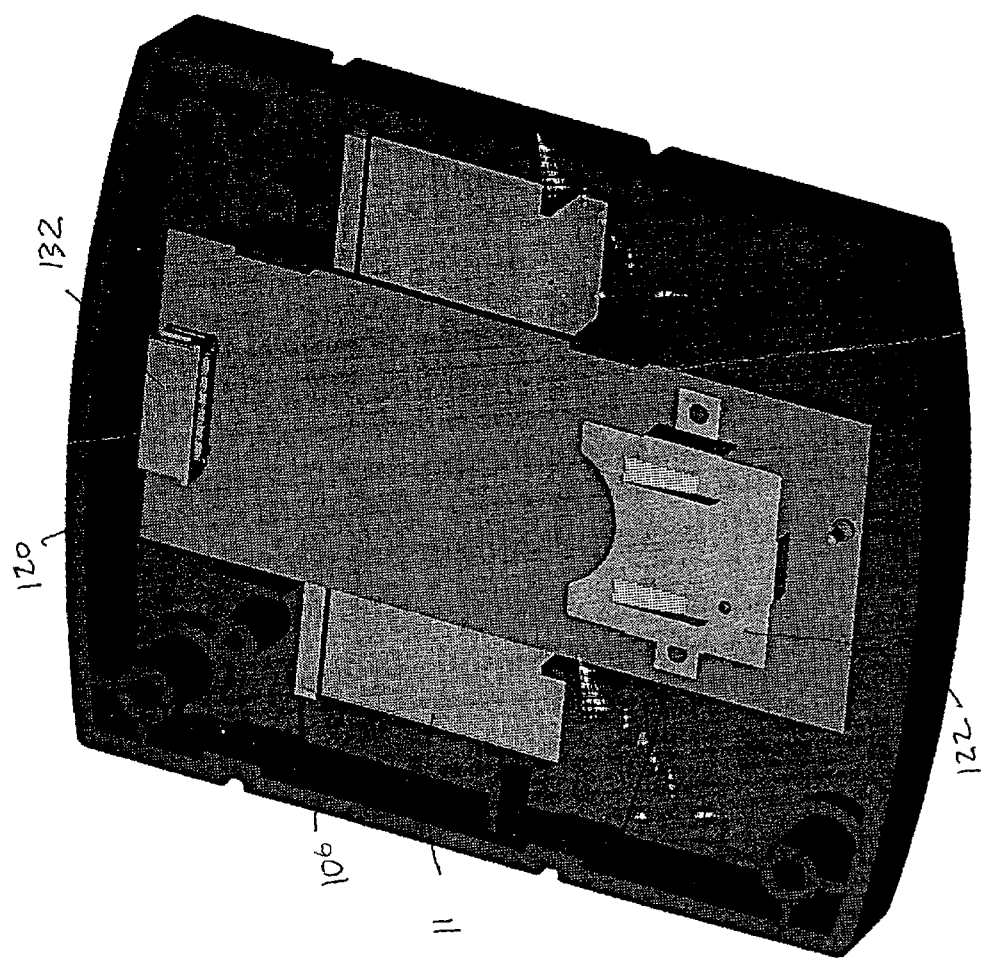
FIG. 21 is a perspective view of the interior of the housing shown in FIG. 18.

As shown in FIG. 21, corridor housing 106 has mounted therein printed circuit board 120 and a plate 122 for mounting battery 124, which is preferably a 3 volt coin size lithium battery. In this way the battery can be changed from the corridor. Interior housing 104 similarly has a printed circuit board 120 but no battery 124. The housings are screwed into door 102 by tamper-proof security screws 126. A cable 130 extends through hole 50 between cable connections 132 on each printed circuit board 120 to electronically connect the two circuit boards.

The following variations are possible in the invention. Rather than have the message selected by the hotel guest continuously displayed on unit 106, the corridor display can be secured so that it only is displayed when viewed by an authorized housekeeping person, for example. This can be accomplished using an access card, or the housekeeping person can carry a handheld wireless device with a monitor so that the selected message is transmitted wirelessly from the housing 104 to the housekeeping wireless device. Similarly messages from Reception or Housekeeping could be communicated wirelessly to housing 104 and displayed to the occupant of the room on display 114. Lights could be provided to cause symbols 117 to flash when selected. A help or emergency message could be added to display 114. The device could function on washrooms by providing a motion sensor for the interior unit 104 and causing an "OCCUPIED" message to display when motion is sensed. In that case only the external unit 106 would be provided with a display 114. A remote control device such as used for televisions could be used in conjunction with the unit 104 to select and display messages. In this case the remote control may have a small LCD display also along with separate buttons corresponding to each message. This allows the guest to confirm the message which has been selected without going to the door. The interior unit 104 could also provide messages to maid service which are not displayed on the exterior, such as "TURN DOWN SERVICE PLEASE" or "STOCK MINIBAR" etc. A flashing signal could alert the maid that a message is waiting on unit 104, and pressing button 118.

In order to avoid drilling a hole through the door 102 a number of options are possible. One is top provide a speaker on unit 104 and a tone decoder on unit 106 and to communicate the selected message by sound waves. Alternatively the controllers in units 104, 106 could communicate by radio frequency transmission.

In one variant, the display 114 further has a display of the time when the hotel guest wishes to have the room made up. In that case, the guest scrolls the message to MAKE UP ROOM, and a further push-button entry is provided to select a time, for example "4 pm" either by scrolling entries or by selecting the numerals from the keypad.

As will be apparent to those skilled in the art in the light of the foregoing disclosure, many alterations and modifications are possible in the practice of this invention without departing from the spirit or scope thereof.

Accordingly, the scope of the invention is to be construed in accordance with the substance defined by the following claims.

What is claimed is:

1. A device for displaying multiple pre-programmed messages, comprising:
   a first housing adapted to be mounted in a first location, a first electronic display mounted in the first housing, a first microprocessor associated with the first housing and being operably connected to the first electronic display for communicating display instructions to the first electronic display to generate a viewable message based on a selected message signal;
   a second housing adapted to be mounted in a second location, a second electronic display mounted in said second housing, a second microprocessor associated with the second housing and having a plurality of programmed message signals, means for conducting electric signals between the first microprocessor and the second microprocessor such that the second microprocessor is operably connected to the first microprocessor for communicating the selected message signal to the first microprocessor, the second microprocessor further being operably connected to the second electronic display for communicating display instructions to the second electronic display to generate a viewable message based on the selected message signal;
   message selection means associated with the second housing and being operably connected to the second microprocessor for enabling a user to select from the plurality of programmed message signals, the second microprocessor communicating the selected message signal to the second electronic display to generate the viewable message and further communicating the selected message signal to the first microprocessor; and
   a source of electricity associated with one of said first or second housings for supplying electric power to the device;
   wherein the message selection means comprises a plurality of buttons, each button being associated with a respective programmed message signal corresponding to a message to be displayed.

2. The device of claim 1 wherein the first and second electronic displays each comprises an LCD display.

3. The device of claim 1 wherein said first and second housings are adapted to be secured to opposite sides of a door and the means for conducting electric signals between the first microprocessor and the second microprocessor extends through the door.

4. The device of claim 1 wherein said source of electricity comprises a battery mounted in one of said first or second housings.

5. The device of claim 1 wherein the first housing includes a motion sensor for sensing motion in the vicinity of the first housing, the motion sensor being operable to turn off the first electronic display in the absence of motion in the vicinity of the first housing to reduce electricity consumption, and to turn on the first display in the presence of motion in the vicinity of the first housing.

6. The device of claim 1 wherein said first and second microprocessors are adapted to communicate wirelessly by audio frequency.

7. The device of claim 1 wherein said first and second microprocessors are adapted to communicate wirelessly by radio frequency.

8. The device of claim 7 wherein the message selection means comprises a plurality of buttons, each button being associated with a programmed message signal corresponding to a message to be displayed.

9. The device of claim 7 wherein the first housing includes a motion sensor for sensing motion in the vicinity of the first housing, the motion sensor being operable to turn off the first electronic display in the absence of motion in the vicinity of the first housing to reduce electricity consumption, and to turn on the first display in the presence of motion in the vicinity of the first housing.

10. A device for displaying multiple pre-programmed messages, comprising:
 a first housing adapted to be mounted in a first location;
 a first electronic display screen mounted in said first housing;
 a second housing adapted to be mounted in a second location;
 a second electronic display screen mounted in said second housing;
 a first microprocessor for providing display information to said display screen in said first housing;
 a second microprocessor for providing display information to said display screen in said second housing;
 a power source in one of said first or second housings for supplying electric power to said display screens and said first and second microprocessors;
 means for selecting a message to be displayed on said first and second displays; and
 means for conducting electric signals between said first and second microprocessors such that said first and second microprocessors are operably connected to each other for communicating said message between said first and second microprocessors;
 wherein the message selection means comprises a plurality of buttons, each button being associated with a respective programmed message signal corresponding to a message to be displayed.

11. The device of claim 10 wherein said first and second display screens each comprises an LCD display.

12. The device of claim 10 wherein said first and second housings are adapted to be secured to opposite sides of a door and the means for conducting electric signals between the first microprocessor and the second microprocessor extends through the door.

13. The device of claim 10 wherein said first and second microprocessors are adapted to communicate wirelessly by radio frequency.

* * * * *